US007398594B2

(12) United States Patent
Ribi

(10) Patent No.: US 7,398,594 B2
(45) Date of Patent: Jul. 15, 2008

(54) BOTTLE SEAL DETACHING DEVICE

(75) Inventor: Guido Ribi, Montreux (CH)

(73) Assignee: Ribi Pack S.p.A., Genoa (IT)

( * ) Notice: Subject to any disclaimer, the term of this patent is extended or adjusted under 35 U.S.C. 154(b) by 529 days.

(21) Appl. No.: 10/480,302

(22) PCT Filed: Jun. 14, 2002

(86) PCT No.: PCT/IB02/02636

§ 371 (c)(1),
(2), (4) Date: Feb. 17, 2004

(87) PCT Pub. No.: WO02/102705

PCT Pub. Date: Dec. 27, 2002

(65) Prior Publication Data

US 2004/0205964 A1 Oct. 21, 2004

(30) Foreign Application Priority Data

Jun. 15, 2001 (CH) .................................... 1086/01

(51) Int. Cl.
*B23P 19/00* (2006.01)

(52) U.S. Cl. ...................... 29/801; 29/426.4; 29/426.5; 156/584

(58) Field of Classification Search .................. 29/801, 29/426.1, 426.4, 426.5; 156/584
See application file for complete search history.

(56) References Cited

U.S. PATENT DOCUMENTS

| | | | | | |
|---|---|---|---|---|---|
| 1,329,309 | A | * | 1/1920 | Prentiss | 261/16 |
| 4,338,767 | A | * | 7/1982 | Cochran | 53/492 |
| 4,717,442 | A | * | 1/1988 | Hopson | 156/584 |
| 5,885,401 | A | * | 3/1999 | Eiban | 156/344 |

* cited by examiner

*Primary Examiner*—David P. Bryant
*Assistant Examiner*—Christopher M Koehler
(74) *Attorney, Agent, or Firm*—James Creighton Wray; Clifford D. Hyra

(57) ABSTRACT

An apparatus for removing extensible plastic elastomer seals from openings of bottles or other glass containers is provided. Aerodynamic pressure drop in a compressed air jet is used. Due to constriction of the air stream caused, either by the incidence of the net on the edge of the openings of said bottles or containers, or by the presence of an appropriate convex surface before of the seal, the containers are removed.

29 Claims, 8 Drawing Sheets

BOTTLE SEAL DETACHING DEVICE

This application claims the benefit of Swiss Application No. 1086/01 filed Jun. 15, 2001.

BACKGROUND OF THE INVENTION

As is known, the sterilization of glass containers such as bottles 17 or jars 10, etc. has always required costly and usually inefficient washing operations prior to filling.

All bottles 17 designed to be filled with various liquids, as well as other glass containers 10, also designed to be filled with other sterile products are maintained in sterile conditions from the manufacturing step to the filling step, by the application of seals 2, i.e. membranes or films made of an extensible plastic elastomer, thanks to state-of-the-art techniques, which form the subject of Swiss patent applications No. 1995 0235/95 and of the associated application PCT/EP 96/00342 and other associated international applications and 1997 01/97 CH and the associated application PCT WO 98/32 668, which membranes or films strongly adhere against the openings 3 of the containers 10 or the bottles 17, thereby maintaining the content thereof in a sterile state until filling.

In order to remove these seals 2, before filling and final closure, said seals 2 have to be extracted rapidly, cost-effectively and without leaving residues on the opening 3.

Some apparatuses have been conceived for this purpose, which essentially involve a mechanical removal effect by rotating brushes, continuously assisted by air intake on the opening to be sealed, but such apparatuses, though effective, cause operation problems at high processing rates and serious difficulties in sterile operations.

SUMMARY OF THE INVENTION

These drawbacks are comprehensively solved by the apparatus of this invention, which uses a possibly sterilized compressed air jet, appropriately passing on the edge 3bis of the opening 3 of the bottle 17 or container 10, and thereby causing the aerodynamic constriction 9 of its stream. This effect is also specially enhanced by the provision of suitable, well-positioned convex surfaces 16, which cause such a local pressure drop on the exposed surface of the seals 2, that said seals 2 are removed without being broken.

The method that uses compressed air to remove stoppers other than seals 2 made of an extensible elastomer film has already been used but in a totally different manner. The compressed air coming from a traditional gun or similar tool was used in such a manner that its violent jet could detach the plug, which had a certain thickness and could oppose a resistance to the shock, and only incidentally and anyway unintentionally was assisted by the negative pressure generated by the impact of a portion of the jet against the obstacle formed by the edge of the bottle opening. In fact, bottles were unsealed by pressure and its direct consequences more than by aerodynamic vacuum.

In the case of the seal 2 made of a very thin (i.e. a few micron) extensible plastic elastomer film, which strongly adheres against the edge 3*bis* of the opening 3 of the bottle 17 or general container 10, the pressure and impact of the jet 8 are ineffective because they do not hit an obstacle but an appropriately diverted incidence of the jet 8 may generate the negative pressure required to detach the seal 2. This aerodynamic action occurs due to the deviation of the jet 8 by the rounded edge 3*bis* of the opening 3, which deviation is appropriately enhanced by using the solid element with a convex surface 12, which adequately constricts the stream of the jet 8 on the upper surface of the seal 2.

Hence, the compressed air used to detach the seal 2 drags the detached polymer scrap 15 and conveys it to the collection station through an optional conduit 13.

In order to collect and compact the scraps 15 so that they do not pollute the environment, a few arrangements have been provided which advantageously supplement the apparatus.

A cylindrical cone-shaped cyclone in which air coming out from the nozzle 1, after passing through the conduit 13 is deviated tangentially to the inner surface at the upper cone- or cylinder-shaped cyclone body 19.

Please replace the paragraph beginning at page 3, line 27 with the following rewritten paragraph.

A metering screw 18 conveys scraps 15 into the trap 38 of the cyclone or directly coming from the discharge 14 of the pipe 13.

Please replace the paragraph beginning at page 4, line 4 with the following rewritten paragraph.

A piston compactor is fed through an adequately sized hole 36 placed at the bottom dead center of the piston 21, by the conduit 13 or the cyclone trap 38. Once the cylinder 22 is full, the piston is operated and the scraps 15 will be compressed against the bottom wall. The cake of compressed scrap 15 will be discharged by means of a full section slide valve 23 which forms the bottom of the cylinder 22.

Typically, the inventive apparatus is used in mass bottling or filling plants.

Therefore, it will operate at the bottling or filling rate, i.e. it will have to remove as many seals 2 as there are bottles 17 or containers 10 to be filled.

To this end, the apparatus has an adequately oriented or tilting support 4, which allows the operation thereof in the most appropriate conditions as the bottles 17 or containers 10 quickly pass through it.

The edges 3bis of the openings 3 will pass before the orifice 11 of the nozzle 1 and possibly under the convex surface 16 as and before the conduit 13 if the latter are present. Hence, they can be easily cleared of the seals 2 at the desired rate.

In order not to dissipate compressed air by keeping the nozzle 1 open and to increase the instantaneous pressure, a valve 5 has been provided which only opens the passage of compressed air when the edges 3bis of the openings 3 pass before the opening 11 of the nozzle 1.

This valve may have an alternate opening and closing operation, but will be more effective if it is of the rotary type, i.e. a valve essentially composed of a spool 33, controlled by a shaft that rotates in a hollow cylinder 34 having two opposite apertures.

The spool 33 will be perforated along one diameter thereof in such a manner that its two openings 35bis may coincide with those 35 of the hollow cylinder which houses it. By this arrangement, compressed air will be allowed to pass every half-turn.

This valve 5 will be driven by a suitable motor 16 of any appropriate type, whereas the valve having an alternate closing and opening operation, if present, may be controlled electrically, hydraulically, or pneumatically.

By appropriately timing the revolutions of the spool or the opening and closing operations with the feed of bottles 17 or containers 10, a proper mass operation will be possible.

To this end, a controlled feed-back system, operating with optical, electric or piezoelectric signals, will control timing.

A sterilizer may be a supplement to the apparatus.

Compressed air coming from a compressor is never sterile. In fact, the waste collected in the air tank and the pipes may be conveyed to the nozzle 1. Further, germs may be present in intake air and be ejected with air from the nozzle 1 on the opening 3 of the bottle 17 or container 10, to further grow in the content thereof.

In order to avoid this serious drawback, which would affect the advantages of extensible plastic elastomer film sealing, the apparatus has been equipped with a sterilizer, e.g. a UV sterilizer. The latter includes a pressure tank 24 with air passing through it to feed the nozzle 1. If this tank has an adequate volume, the flow may be locally slowed down, hence compressed air may remain for a sufficient time in said tank 24.

This container is provided with externally powered UV bulbs 25 having tight connections for sterilizing air in transit.

By appropriately sizing the container 24 as a function of the average outflow rate and of the radiant power of UV bulbs 25, a proper exposure for the required sterility may be ensured. Said container may also be used as a condenser for the suspended lubricant particles of the compressor system. To this end, a SAS discharge 32 will be placed on the bottom of the container 24.

FIGS. 10 to 12 are different views of one embodiment of the invention.

According to a first characteristic, the scrap conveying conduit has an orifice in the form of a spherical sector-shaped cap 113 which has two recesses 213 on the opposite sides parallel to the direction of compressed air jets.

The two recesses allow the opening of the container to reach a position which coincides with the introduction of the pipe 13 under the cap 113. One, two or more blowing nozzles 11 are disposed on the sides of the container opening and are oriented in such a manner as to direct an air jet against the edge of the container opening between the cap 113 and said opening. Particularly, in the illustrated figures, the two blowing nozzles 11 are arranged in diametrically opposite positions and perpendicular or substantially perpendicular to the container feed direction, as well as to the diametrically opposite recesses 213 of the cap 113.

A presence detector 40 detects the presence of a container and starts the nozzles for removing its plastic film seal.

Nozzles 11 are fed by pipes 6. Pressurized air is generated by a compressor (not shown) by means of a plenum chamber 41.

In accordance with an improvement, compressed air may be also heated and/or dried. In such heated and/or dried condition, the removing and conveying action is generally more effective.

As an additional improvement which increases the Venturi effect whereby scraps are conveyed in the pipe 13, compressed air is additionally provided downstream from the inlet of said conduit 13. Said compressed air may be supplied through a pipe 6' from the same compressed air feed source to the nozzles 11. This additional compressed air supply in the conduit 13 increases the Venturi effect for scrap suction and conveyance. Furthermore, as is shown in the drawing, the additional compressed air jet directly supplied 6' in the conduit 13 is synchronized with nozzle operation, thanks to the valve on the outlet of the plenum 41, which is schematically shown and generally denoted as 42.

Moreover, the plenum must be imperatively placed in the proximity of the nozzle to obtain a stronger air jet and generate a shock wave which facilitates seal detachment.

Regarding film detachment arrangements, there may be also provided ultrasound systems, sound or electromagnetic wave systems, eddy current systems, or capacitive systems, which help to weaken the seal grip.

This action may be also prepared by providing a previous thermal shock on the seal, either by freezing or heating it, or by directing an air flow thereon to change the charge characteristics of the dielectric.

More particularly, the conduit 13 has an inverted U-shaped curved end. A branch 313 is connected to the rest of the conduit 13 for scrap removal, whereas the other portion 413 ends with the cap 113.

Therefore, the conduit 13 is generally profiled in such a manner as to form a curve or a loop for connecting its inlet end to the rest of the conduit 13. The additional compressed air jet is supplied at said curve or loop, particularly at the center of said curve or loop and, if the latter has a vertical orientation, like in the inverted U-shaped illustrated arrangement, at its apex or higher.

With particular reference to FIG. 12, multiple inlets, i.e. seal removal stations, may be provided for the conduit 13, arranged in succession and associated to one or more nozzles and to one or more presence detector.

Particularly, the conduit 13 branches off at its end by two starting portions each ending, at the inlet end, by a cap 113. The two starting portions 413', 413" are disposed in such a manner as to be aligned, along the containers path, one behind the other, with reference to the container feed direction. By this arrangement, the plastic film seal removal procedure may be started successively twice, to obtain the absolute certitude that the seal is actually removed.

At each end portion, a presence detector may be provided for detecting scrap passage, and for operating the second extraction station whenever such detection signal is received, which second station may remain in the quiescent state when seal removal is detected in the first station.

Obviously, as shown in FIG. 12, the end portion may be shaped as described in the previous embodiments, in such a manner that each branch forms, with the conduit 13 connected thereto, an inverted U or anyway a curved portion, preferably having a vertical orientation, which may or may not have an inlet for a compressed air pipe, as shown in FIGS. 10 and 11.

KEY OF FIGURES

Figure 1:
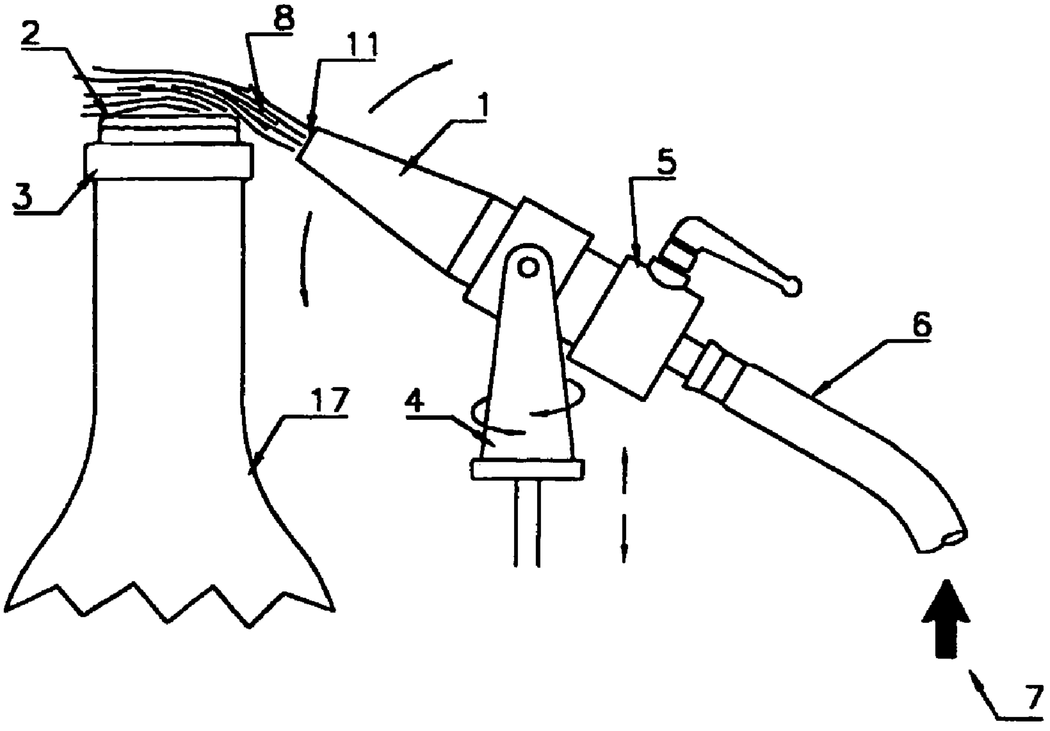
FIG. 1 shows a simplified operating apparatus.

FIG. 1 shows a typical simplified operating apparatus. It includes the following:

1 Nozzle

2 Seal

3 Bottle opening

3bis Opening edge 3

4 Support

5 General valve

6 Compressed air feed pipe

7 Compressed air flow

8 Jet

9 Stream constriction

11. Nozzle orifice

17 Bottle

Figure 2:
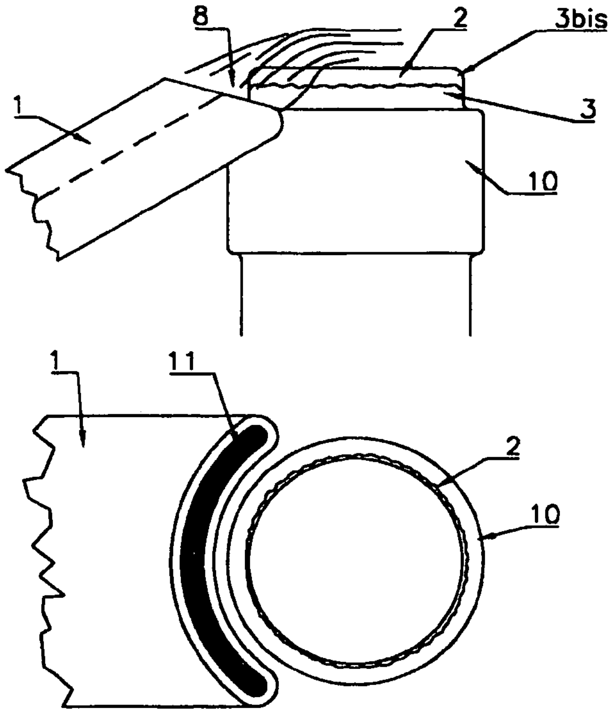
FIG. 2 is a sectional and plan view of a general container, more specifically a jar hit by a compressed air jet.

FIG. 2 is a sectional and plan view of a general container, more specifically a jar hit by a compressed air jet. It includes the following:

1 Nozzle

2 Seal

3 Jar opening

3bis Opening edge 3

8 Jet

9 Stream constriction

10 Container

11. Nozzle orifice.

Figure 3:
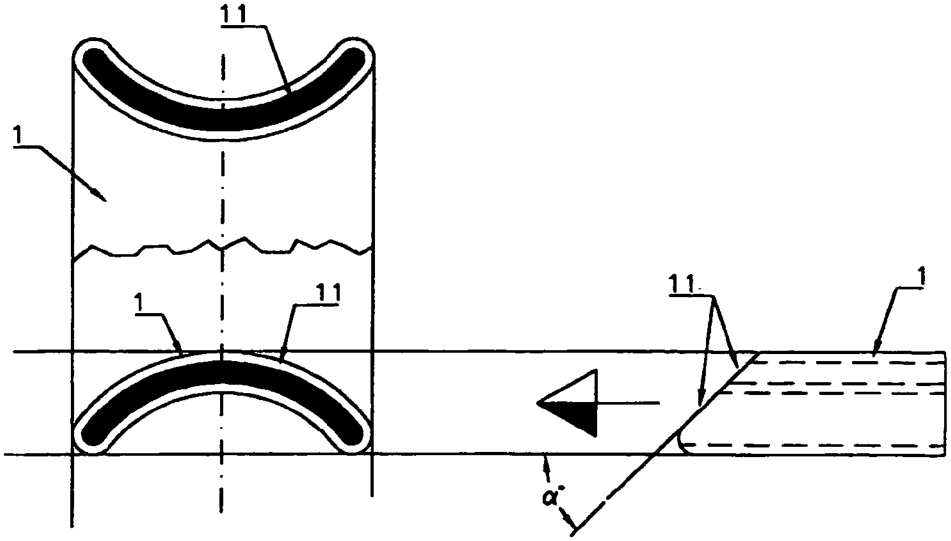
FIG. 3 is a plan and sectional view of a general crescent-shaped nozzle, cut off through an angle $\alpha°$ with respect to jet direction.

FIG. 3 is a plan and sectional view of a general crescent-shaped nozzle, cut off through an angle $\alpha°$ with respect to jet direction. It includes the following:

1 Nozzle

12. Nozzle orifice $\alpha°$ Nozzle cutoff angle.

Figure 4:
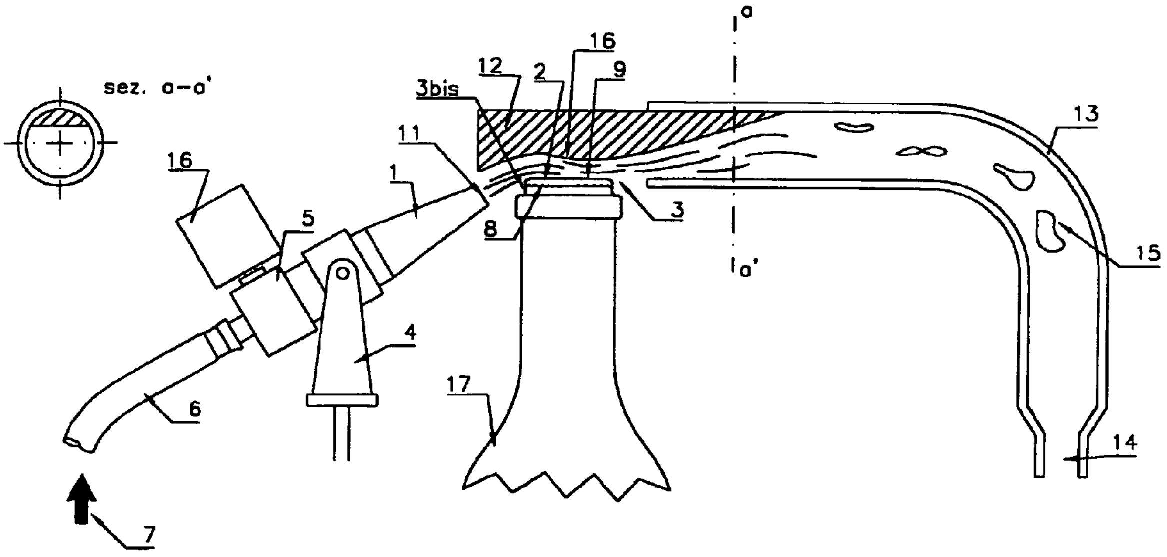
FIG. 4 shows a typical apparatus to be included in a filling chain, equipped with an automatic valve, a convex surface element and a scrap conveying conduit.

FIG. 4 shows a typical apparatus to be included in a filling chain, equipped with an automatic valve, a convex surface element and a scrap conveying conduit. It includes:

1 Nozzle

2 Seal

3 Bottle opening

3bis Opening edge 3

4 Support

5 Valve

6 Compressed air feed pipe

7 Compressed air flow

8 Jet

9 Stream constriction

11 Nozzle orifice

12 Solid element with a convex surface

13 Scrap conveying conduit

14 Throat in the conduit 13, particularly at the distal discharge port.

15 Scraps

16 Convex surface

17 Bottle a-a' A given section.

Figure 5:
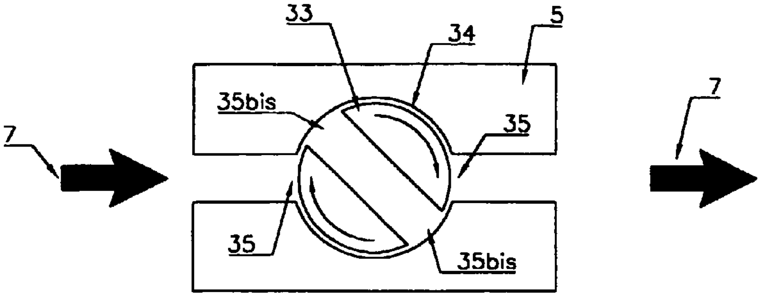
FIG. 5 is a schematic view of a rotary valve.
Figure 5:
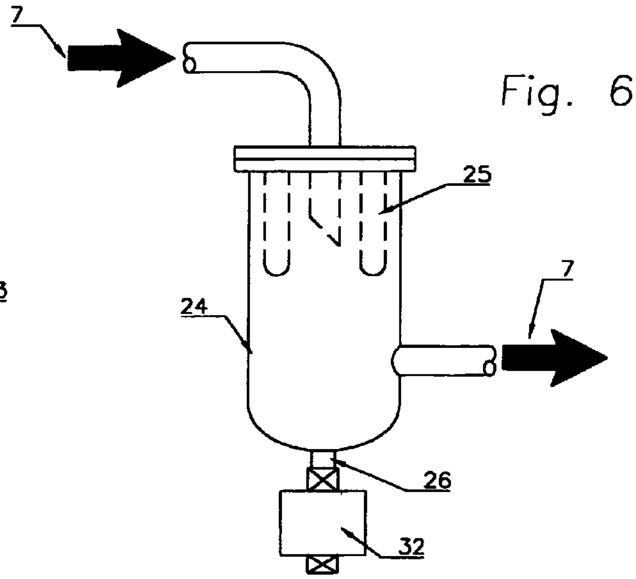

FIG. 5 is a schematic view of a rotary valve. It includes the following:

7 Compressed air flow

33 Rotating spool

34 Hollow cylinder with the spool 33 therein

35 Opposite openings of the cylinder

35bis Opposite openings of the spool.

Figure 6:
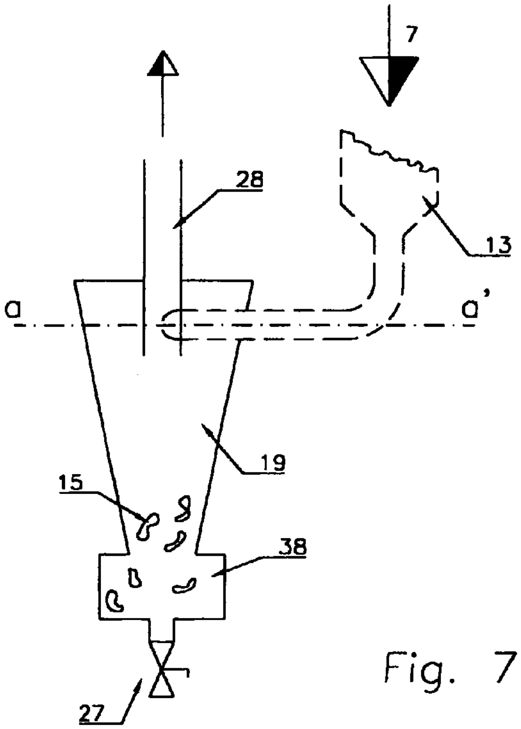
FIG. 6 shows a UV sterilizer.

FIG. 6 shows a UV sterilizer. It includes:

7 Compressed air flow

24 Pressure container

25 UV bulbs

26 Condensate drainage system

32 S.A.S.

Figure 7:
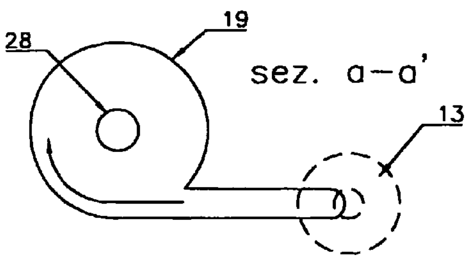
FIG. 7 shows a schematized cyclone.

FIG. 7 shows a schematized cyclone, and includes:

7 Compressed air flow

13 Scrap conveying conduit

15 Scraps

19 Cyclone body

27 Scrap discharge system

28 Air intake

38 Trap a-a' A section.

Figure 8:
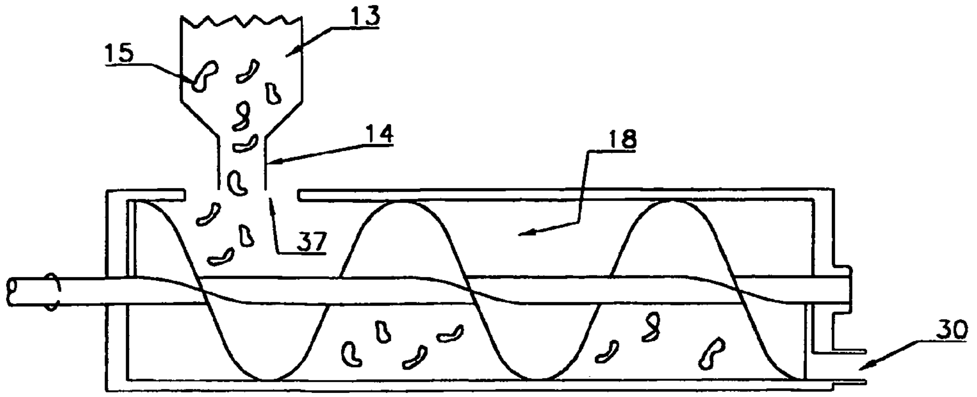
FIG. 8 shows a scrap compacting screw.

FIG. 8 shows a scrap compacting screw. It includes:

13 Scrap conveying conduit

14 Conduit throat

15 Scraps

18 Metering screw

30 Screw discharge

37 Scrap inlet hole

Figure 9:
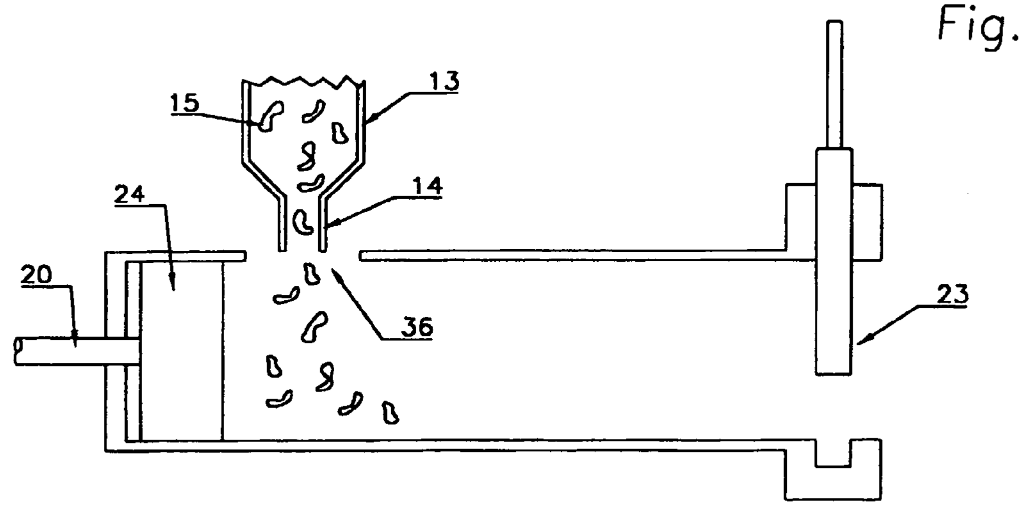
FIG. 9 shows a piston compactor.

FIG. 9 shows a piston compactor. It includes the following:

13 Scrap conveying conduit

14 Conduit throat

15 Scraps

20 Piston rod

21 Piston

22 Cylinder

23 Slide valve

36 Scrap inlet hole

Figure 10:
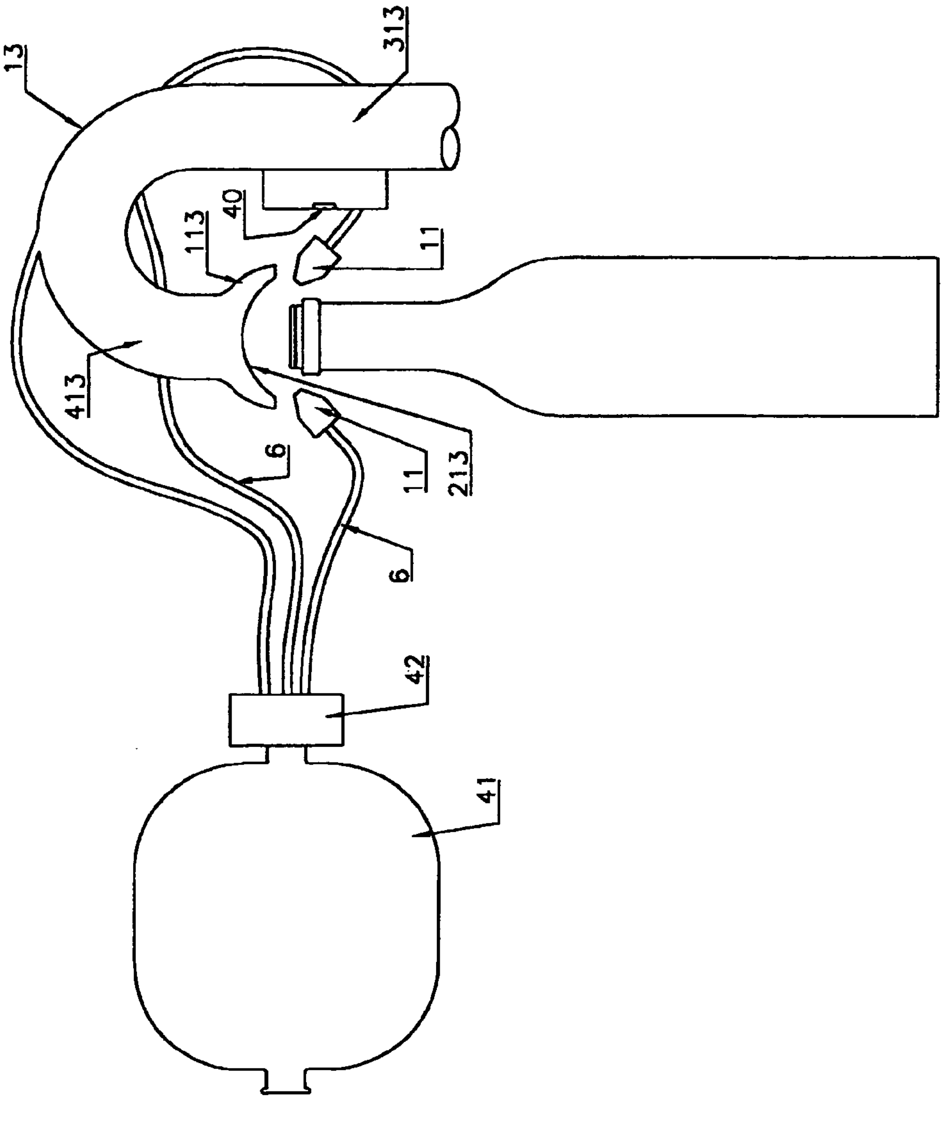
FIG. 10 schematically shows a side elevational view of an apparatus according to the invention, in the container feed direction.

FIG. 10 schematically shows a side elevational view of an apparatus according to the invention, in the container feed direction. The figure includes:

6 Air supply pipes

6' The pipe for supplying compressed air to the scrap extracting conduit 13

11 Nozzles

13 Scrap extracting conduit

113 Cap

213 Recesses in the cap 113

313 Straight branch of the inverted U-shaped end

413 Straight branch of the inverted U-shaped end

40 Container presence detector

41 Compressed air plenum

42 Valve

Figure 11:
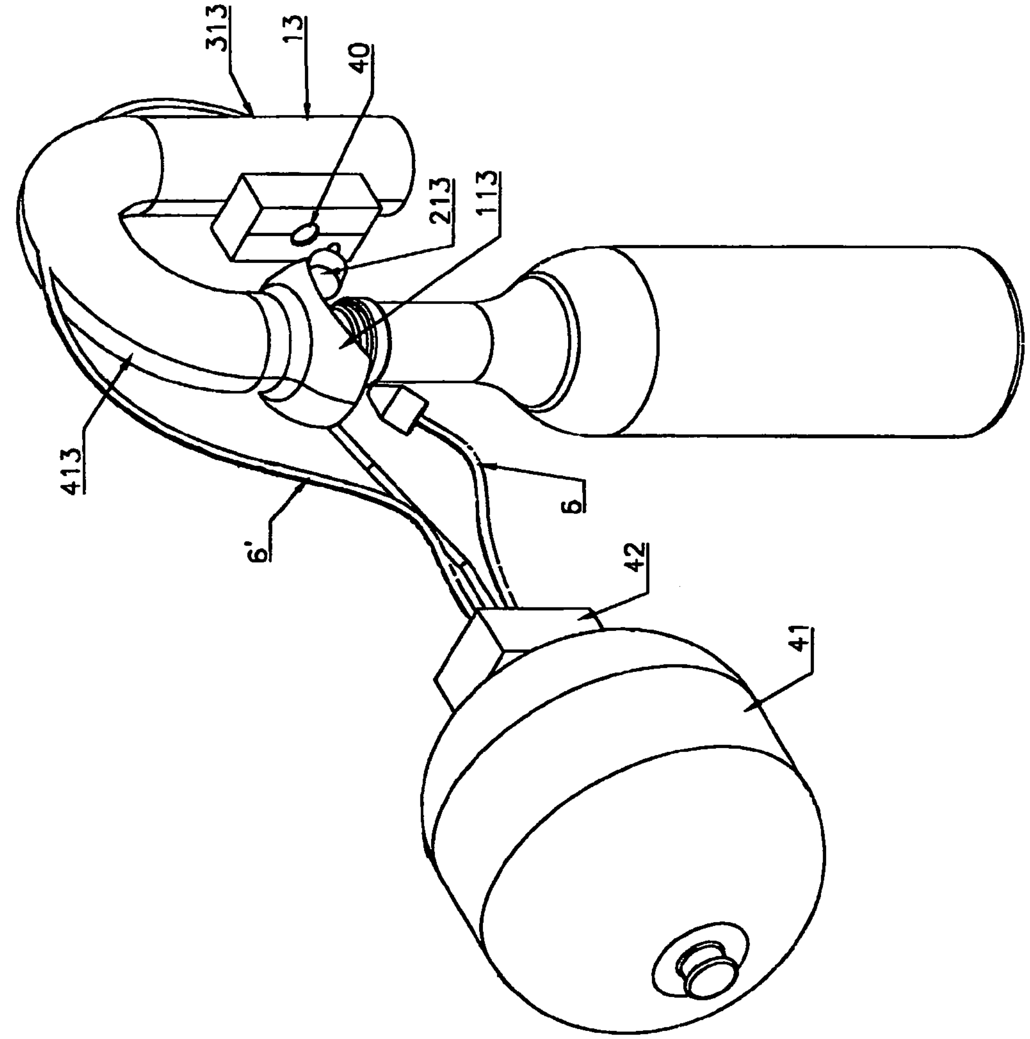
FIG. 11 is a perspective view of the apparatus of FIG. 11 which shows the same parts as shown in FIG. 10.

FIG. 11 is a perspective view of the apparatus of FIG. 11 which shows the same parts as shown in FIG. 10.

Figure 12:
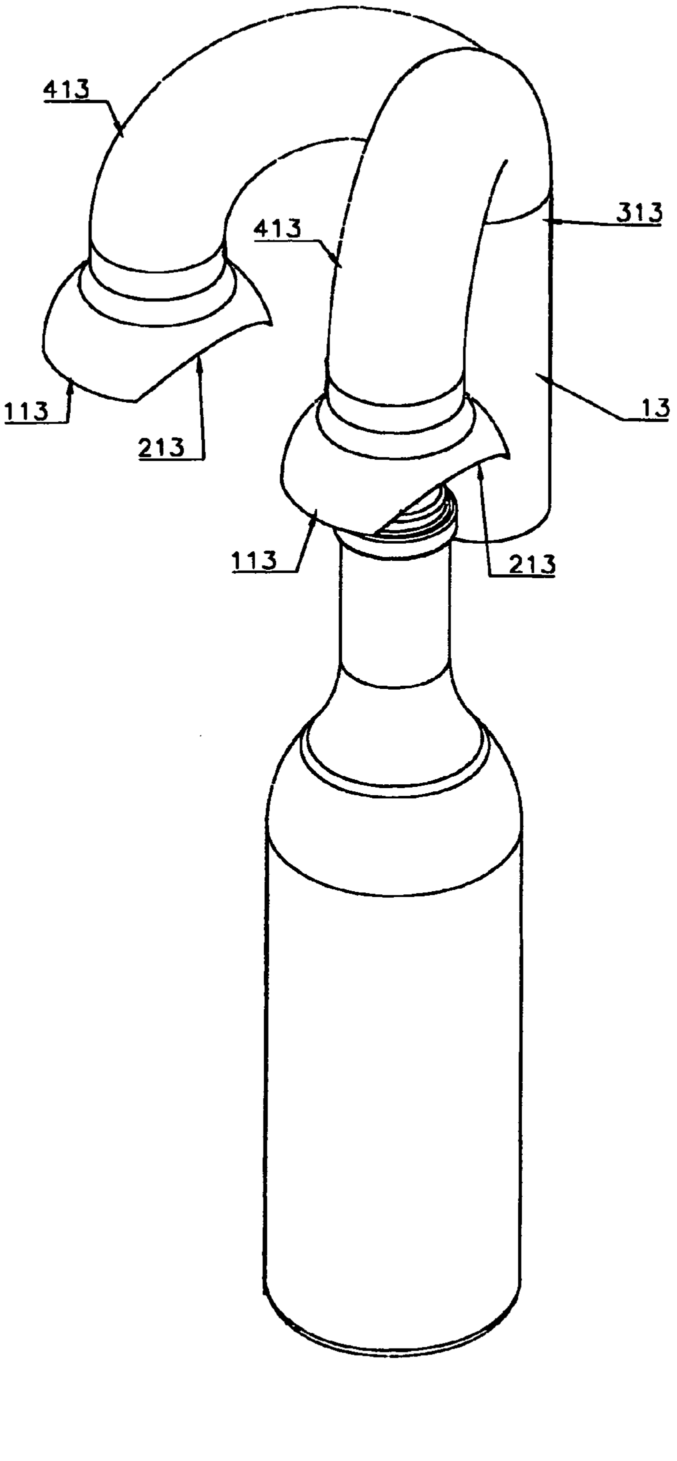
FIG. 12 is a schematic view of a variant embodiment having two successive seal removal stations, in which the parts as shown in FIGS. 10 and 11 have been omitted for the sake of simplicity.

FIG. 12 is a schematic view of a variant embodiment having two successive seal removal stations, in which the parts as shown in FIGS. 10 and 11 have been omitted for the sake of simplicity. This Figure includes:

13 Scrap extracting conduit

313 A common branch of the inverted U-shaped end portion

413 The two vertical branches of the two inverted-U shaped branches connected to an additional common branch 313.

113 The caps of each branch

213 The recesses of said caps 113.

The invention claimed is:

1. A seal detaching apparatus comprising a nozzle for detaching and extracting extensible plastic elastomer film seals, which adhere against edges of openings of bottles or other containers, wherein the nozzle may be stationary or tilting, the nozzle being adapted to impart a direction and a velocity to a compressed air flow, further comprising a stationary or movable support attached to the nozzle, which orients the nozzle to direct the compressed air flow at the edge of the opening of the bottles or containers, and a compressed air source or generator connected to the nozzle, wherein the compressed air flow passes across the openings of the bottles or other containers, generating a negative pressure over the openings.

2. An apparatus as claimed in claim 1, wherein the apparatus has at least one stationary or movable solid element, which is appropriately positioned relative to the nozzle, and has at least one convex surface curved about one or more than one axis, wherein said surface of the solid element is disposed, when the apparatus is in the operating state, above the opening of the sealed bottle or container in such a manner as to generate a constriction of the stream of the compressed air flow at the upper surface of the extensible plastic elastomer seal.

3. An apparatus as claimed in claim 1, wherein the orifice of the nozzle is circular, and has a shape and size for imparting the direction and velocity to the compressed airflow.

4. An apparatus as claimed in claim 1, wherein compressed air flow is deflected away from being perpendicular to the orifice of the nozzle.

5. An apparatus as claimed in claim 1, wherein the apparatus has a rotary valve for quickly opening and closing the air flow, composed of a spool, having a hole formed along one diameter thereof, and tightly rotating inside a cylinder also perforated along its diameter, in such a manner that rotation of the spool causes four ends of the holes to simultaneously coincide every 180° of rotation, wherein said spool may be driven by a suitable motor, whose rotation, hence the opening and closure of the valve, may be synchronized with the positions of the bottles or containers to be unsealed, relative to the apparatus.

6. An apparatus as claimed in claim 1, wherein the apparatus has a UV compressed air sterilizer further comprising a pressure container through which compressed air from the compressed air source passes, pressure resistant UV bulbs arranged inside the container, wherein a volume of said container allows a sufficiently long exposure of the transiting compressed air to UV radiation, and a condensate drainage system on a bottom of the container.

7. An apparatus as claimed in claim 1, further comprising means for heating compressed air supplied to the nozzles.

8. An apparatus as claimed in claim 1, further comprising means for drying compressed air supplied to the nozzles.

9. An apparatus as claimed in claim 1, wherein seal detachment is assisted by the application of waves and by electric effects.

10. An apparatus as claimed in claim 1, wherein seal detachment is assisted by previous application of an air flow having a function to change chemical or physical characteristics of the seal.

11. An apparatus as claimed in claim 1, wherein seal detachment is assisted by previous application of a thermal shock of the film, with respect to the bottle.

12. An apparatus as claimed in claim 1, wherein seal detachment is assisted by previous application on the seal of a freezing gas jet.

13. An apparatus as claimed in claim 1, wherein seal detachment is assisted by previous application of a heater.

14. An apparatus as claimed in claim 1, wherein air jet made of vapor.

15. A seal detaching apparatus comprising a nozzle for detaching and extracting extensible plastic elastomer film seals, which adhere against edges of openings of bottles or other containers, wherein the nozzle may be stationary or tilting, the nozzle being adapted to impart a direction and a velocity to a compressed air flow, further comprising a stationary or movable support attached to the nozzle, which orients the nozzle to direct the compressed air flow at the edge of the opening of the bottles or containers, and a compressed air source or generator connected to the nozzle, wherein the apparatus includes an open conveying conduit for removed seals and scraps of the detached seals, and wherein the conduit has an inlet generally oriented with an orifice of the nozzle and positioned at an opposite side of said orifice with respect to the opening of the bottle or container to be unsealed, whereas the conduit has a discharge port.

16. An apparatus as claimed in claim 15, wherein the apparatus includes a container with conical or cylindrical inner side walls, which has the function of a cyclone, wherein the conduit ends with its longitudinal axis tangent to a conical or cylindrical surface concentric to that of the inner side wall of the container, wherein said container has an air exhaust hole associated to a pipe section, situated at an end wall of the container, a bottom discharge port at a bottom of the container connected to a bottom trap for separated scraps.

17. An apparatus as claimed in claim 16, wherein the apparatus has a metering screw compactor for the removed plastic film seals and scraps, connected through a hole formed in a wall of the screw, to a distal end of the conduit, to the bottom discharge port or to the bottom trap of the container, wherein said metering screw a discharge port at an end of the metering screw.

18. An apparatus as claimed in claim 16, further comprising a compactor, made of a piston sliding in a cylinder connected through a hole formed in the wall of the cylinder, to the distal end of the conduit or to a conduit coming from the bottom discharge port or the bottom trap for compacting the removed seals and scraps in the cylinder, wherein the piston is driven by a rod moved by a hydraulic or pneumatic jack, and wherein at an end-of-stroke of the piston, the cylinder has a valve for the discharge of compacted scraps.

19. A seal detaching apparatus comprising a nozzle for detaching and extracting extensible plastic elastomer film seals, which adhere against edges of openings of bottles or other containers, wherein the nozzle may be stationary or tilting, the nozzle being adapted to impart a direction and a velocity to a compressed air flow, further comprising a stationary or movable support attached to the nozzle, which orients the nozzle to direct the compressed air flow at the edge of the opening of the bottles or containers, and a compressed air source or generator connected to the nozzle, further comprising a scrap conveying conduit having an inlet, a discharge port and a compressed air supply pipe which runs into the scrap conveying conduit downstream from the inlet thereof.

20. An apparatus as claimed in claim 19, wherein the pipe supplying compressed air downstream from the inlet of the scrap conveying conduit is connected to the same compressed air source as the nozzle, there being provided means for intercepting the compressed air supply to the nozzles and to the pipe which operate in a synchronized manner.

21. An apparatus as claimed in claim 19, wherein the apparatus further comprises one, two or more nozzles arranged around the openings of the bottles or other containers.

22. An apparatus as claimed in claim 21, wherein the apparatus includes at least two diametrically opposed nozzles.

23. An apparatus as claimed in claim 22, wherein the scrap conveying conduit has at least two starting scrap conveying sections from different positions of the container along a path thereof, which at least two starting sections join together into a common conduit.

24. An apparatus as claimed in claim 23, wherein each starting section of the scrap conveying conduit has an inlet with a cap, the opening of the container being placed thereunder, and the jet of the at least two nozzles being generated and oriented between said cap and the opening of the container, with the edge of the container being tilted toward the scrap conveying conduit inlet.

25. An apparatus as claimed in claim 23, wherein the cap has a spherical sector shape and recesses on diametrically opposite sides, which recesses are in line with the path of the container openings under the cap.

26. An apparatus as claimed in claim 23, wherein the one or more starting sections of the scrap conveying conduit have an elongated shape.

27. An apparatus as claimed in claim 26, wherein the conduit has a curved section with an apex, and the pipe for supplying said conduit with compressed air, downstream from the inlet is connected to said conduit at the curved section thereof, preferably at the apex of said curved section.

28. An apparatus as claimed in claim 27, wherein the curved section of the conduit has an inverted U shape.

29. An apparatus as claimed in claim 26, wherein the curved section is a starting portion of the conduit and has a substantially vertical orientation.

* * * * *

UNITED STATES PATENT AND TRADEMARK OFFICE

CERTIFICATE OF CORRECTION

PATENT NO. : 7,398,594 B2
APPLICATION NO. : 10/480302
DATED : July 15, 2008
INVENTOR(S) : Guido Ribi It is certified that error appears in the above-identified patent and that said Letters Patent is hereby corrected as shown below:

In Column 2, Lines 13 and 14: Delete "Please replace the paragraph beginning at Page 3, Line 27 with the following rewritten paragraph."

In Column 2, Line 13: Insert --Then, the separated scraps 15 are collected in the conventional trap 38, whereas the exhausted air is vented from the upper portion of the cyclone, through a suitable ducted and centered hole 28.--

In Column 2, Lines 18 and 19: Delete "Please replace the paragraph beginning at Page 4, Line 4 with the following rewritten paragraph."

In Column2 , Line 18: Insert --This adequately sized metering screw may also have the functions of a compactor, of its size and the shape of its exhaust port (30) are adapted therefore.--

Signed and Sealed this

Thirtieth Day of September, 2008

JON W. DUDAS
*Director of the United States Patent and Trademark Office*